United States Patent
Horn et al.

(10) Patent No.: US 9,134,908 B2
(45) Date of Patent: Sep. 15, 2015

(54) LOGICAL VOLUME SPACE SHARING

(71) Applicant: Apple Inc., Cupertino, CA (US)

(72) Inventors: Deric S. Horn, Cupertino, CA (US);
David A. Majnemer, Cupertino, CA (US); Wenguang Wang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 13/737,929

(22) Filed: Jan. 9, 2013

(65) Prior Publication Data
US 2014/0195761 A1 Jul. 10, 2014

(51) Int. Cl.
*G06F 12/00* (2006.01)
*G06F 3/06* (2006.01)

(52) U.S. Cl.
CPC ............ *G06F 3/0607* (2013.01); *G06F 3/0644* (2013.01); *G06F 3/0689* (2013.01)

(58) Field of Classification Search
CPC ............................. G06F 12/00; G06F 3/0629
USPC ................... 711/100, 154, 166, 170
See application file for complete search history.

(56) References Cited

U.S. PATENT DOCUMENTS

| | | | |
|---|---|---|---|
| 6,205,531 B1 * | 3/2001 | Hussain ........................ | 711/207 |
| 6,308,247 B1 * | 10/2001 | Ackerman et al. ............ | 711/206 |
| 7,020,758 B2 * | 3/2006 | Fisk ............................... | 711/172 |
| 7,280,536 B2 | 10/2007 | Testardi | |
| 7,386,663 B2 * | 6/2008 | Cousins ........................ | 711/114 |
| 8,065,304 B2 * | 11/2011 | Ross .............................. | 707/737 |
| 8,341,199 B2 | 12/2012 | Fujimoto | |
| 8,516,182 B2 * | 8/2013 | Yoshii et al. .................. | 711/103 |
| 8,560,558 B2 * | 10/2013 | Watanabe et al. ............. | 707/756 |
| 2012/0011340 A1 * | 1/2012 | Flynn et al. ................... | 711/171 |
| 2012/0066469 A1 | 3/2012 | Yochai et al. | |
| 2012/0117301 A1 * | 5/2012 | Wingard .......................... | 711/6 |

FOREIGN PATENT DOCUMENTS

WO 2012/114338 A1 8/2012

* cited by examiner

*Primary Examiner* — Tuan Thai
(74) *Attorney, Agent, or Firm* — Downey Brand LLP (57) ABSTRACT

Space sharing between logical volumes is achieved through a technique that enables available storage space to be flexibly consumed and released by the logical volumes. Each logical volume is associated with an address tree that defines how available storage space is consumed by the logical volume. The technique involves receiving an input/output (I/O) operation that specifies a logical address within an address tree associated with the logical volume, parsing the address tree to identify an entry therein, if any, that is associated with the logical address, where the entry stores physical address information that is associated with the logical address. If it is determined that the entry exists, then one or more translated I/O operations are generated based on the physical address information and forwarded to a physical device manager to carry out the translated one or more I/O operations.

17 Claims, 11 Drawing Sheets

LOGICAL VOLUME SPACE SHARING

TECHNICAL FIELD

The present invention relates generally to computing devices. More particularly, present embodiments of the invention relate to a method and system for logical volume space sharing.

BACKGROUND

The landscape of computer file system technologies is ever-changing to meet the flexibility demands being made by end-users of computer systems. One present limitation seen in conventional file systems is related to the inability or difficulty of easily expanding and contracting the size of logical volumes. For example, a simple partition that is backed by a single hard drive cannot shrink or grow in size without migrating data associated with the partition off of the hard drive, resizing the partition, and then copying the migrated data back into the partition. More recent technologies have attempted to alleviate this problem by enabling logical volumes to easily be expanded in size. For example, the ZFS file system by Sun Microsystems® enables administrators to expand the size of a logical volume by increasing the amount of physical storage space that is available to the logical volume (e.g., by adding another hard drive). However, this approach does not enable logical volumes to, for example, to utilize free space that may be available in neighboring partitions that are backed by the same group of storage devices.

Accordingly, what is needed in the art is a technique directed to enabling storage space to be shared between logical volumes.

SUMMARY

This paper describes various embodiments that enable available storage space to be shared between logical volumes. Each logical volume is associated with an address tree that defines how available storage space provided by one or more storage devices is consumed by the logical volume. Input/output (I/O) operations—such as read, write, and trim operations—are issued to the logical volumes and are handled in a manner that enables data stored by the storage devices to be flexibly consumed and released by the logical volumes. In this manner, the logical volumes are capable of shrinking and growing in size without requiring the overhead and complexities associated with resizing logical volumes using conventional approaches. For example, embodiments of the invention enable the size of a logical volume to shrink without requiring data associated therewith to be relocated within one or more storage devices that back the logical volume. Such techniques are enabled by various methods and techniques described herein.

One embodiment of the present invention sets forth a method for carrying out an I/O operation issued to a logical volume. The method includes the steps of receiving the I/O operation, where the I/O operation specifies a logical address within an address tree associated with the logical volume, and parsing the address tree to identify an entry therein, if any, that is associated with the logical address, where the entry stores physical address information that is associated with the logical address. If the entry exists, then one or more translated I/O operations are generated based on the physical address information, and the one or more translated I/O operations are forwarded to a physical device manager to carry out the translated one or more I/O operations.

Other embodiments include a system that is configured to carry out the method steps described above, as well as a non-transitory computer readable medium storing instructions that, when executed by a processor, cause the processor to carry out the method steps described above.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The following relates to a portable computing device such as a laptop computer, net book computer, tablet computer, etc. The portable computing device can include a multi-part housing having a top case and a bottom case joining at a reveal to form a base portion. The portable computing device can have an upper portion (or lid) that can house a display screen and other related components whereas the base portion can house various processors, drives, ports, battery, keyboard, touchpad and the like. The base portion can be formed of a multipart housing that can include top and bottom outer housing components each of which can be formed in a particular manner at an interface region such that the gap and offset between these outer housing components are not only reduced, but are also more consistent from device to device during the mass production of devices. These general subjects are set forth in greater detail below.

Figure 1:
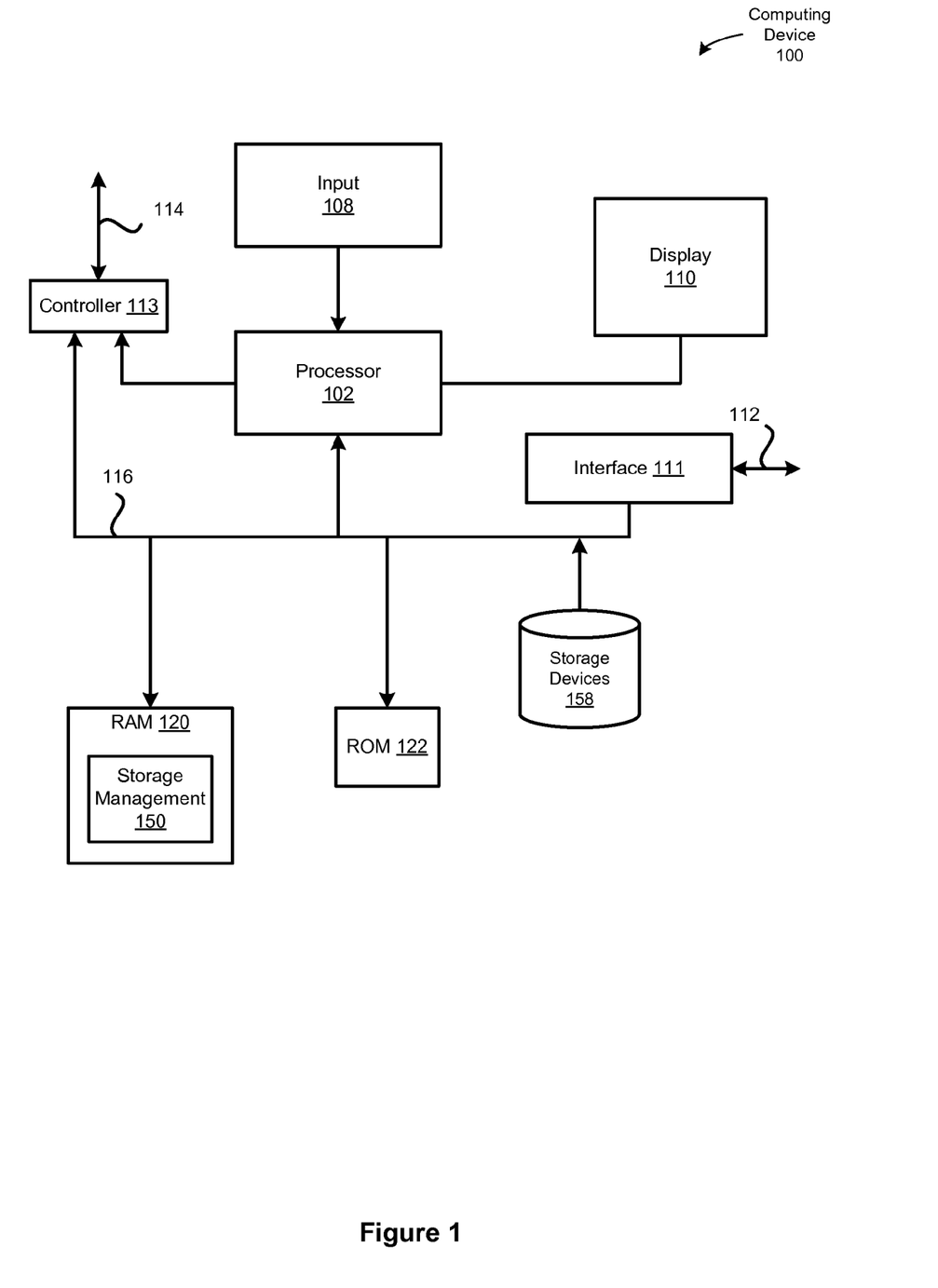
FIG. 1 illustrates a system configured to implement the various embodiments of the invention described herein.

FIG. 1 is a block diagram of a computing device 100 suitable for implementing the embodiments described herein. As shown in FIG. 1, computing device 100 can include a processor 102 that represents a microprocessor or controller for controlling the overall operation of computing device 100. Computing device 100 can also include user input device 108 that allows a user of the computing device 100 to interact with the computing device 100. For example, user input device 108 can take a variety of forms, such as a button, keypad, dial, touch screen, audio input interface, visual/image capture input interface, input in the form of sensor data, etc. Still further, computing device 100 can include a display 110 (screen display) that can be controlled by processor 102 to display information to the user. Data bus 116 can facilitate data transfer between at least storage devices 158, processor 102, and controller 113. Controller 113 can be used to interface with and control different equipment through equipment control bus 114. Computing device 100 can also include a network/bus interface 111 that couples to data link 112. Data link 112 can allow computing device 100 to couple to a host computer or to accessory devices. The data link 112 can be provided over a wired connection or a wireless connection. In the case of a wireless connection, network/bus interface 111 can include a wireless transceiver.

Computing device 100 also includes storage devices 158, which can comprise a single disk or a plurality of disks (e.g., hard drives), and includes a storage management module 150 that manages one or more partitions (also referred to herein as "logical volumes") within the storage devices 158. In some embodiments, storage devices 158 can include flash memory, semiconductor (solid state) memory or the like. The computing device 100 can also include Random Access Memory (RAM) 120 and Read-Only Memory (ROM) 122. The ROM 122 can store programs, utilities or processes to be executed in a non-volatile manner. The RAM 120 can provide volatile data storage, and stores instructions related to components of the storage management module 150 that are configured to carry out the various techniques described herein.

Figure 2:
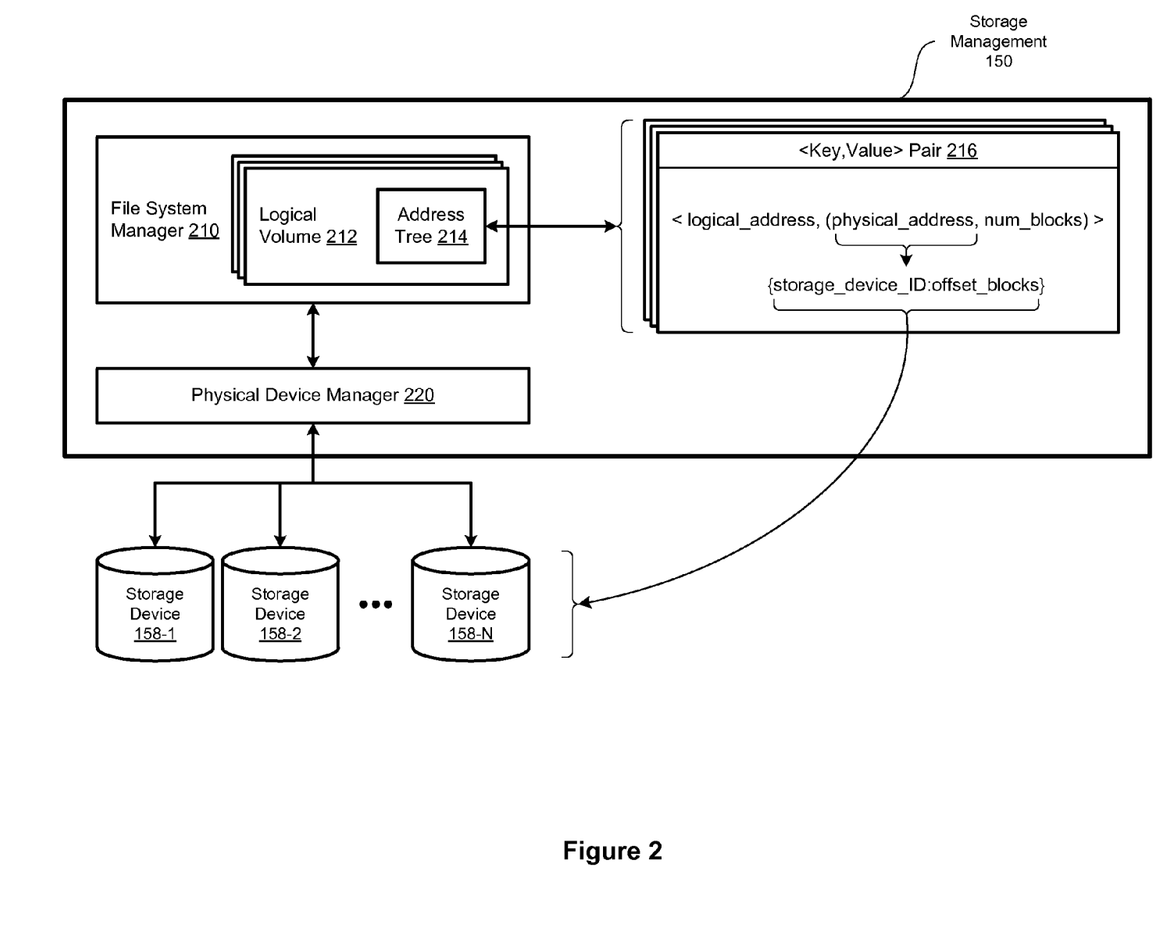
FIG. 2 illustrates a more detailed view of a component of the system of FIG. 1, according to one embodiment of the invention.

FIG. 2 illustrates a more detailed view of the storage management module 150, according to one embodiment of the present invention. As shown in FIG. 2, the storage management module 150 includes a file system (FS) manager 210 and a physical device manager 220. The FS manager 210 manages one or more logical volumes 212 that are each backed by one or more of the storage devices 158. In particular, each logical volume 212 has associated therewith an address tree 214 that defines free/used space within the logical volume 212. Specifically, each address tree 214 includes a set of <key,value> pairs 216 that can be organized into a variety of data structures, such as an ordered list, a binary search tree, a B-tree or a log-structured merge (LSM) tree.

As illustrated in FIG. 2, the key portion of a <key,value> pair 216 comprises a logical address (i.e., logical_address) within the corresponding logical volume 212, and the value portion of the <key,value> pair 216 comprises a physical address (i.e., physical_address) within one of the storage devices 158 as well as a number of blocks (i.e., num_blocks) that are associated with the logical address. FIG. 2 also illustrates that each physical address specified in the value portion of a <key,value> pair 216 is comprised of a storage device 158 identifier (ID) (i.e., storage_device_ID) that corresponds to a particular one of the storage devices 158 as well as an offset (i.e., offset_blocks) that addresses a specific area within the particular one of the storage devices 158. As described in greater detail herein, this configuration enables both the FS manager 210 and the physical device manager 220 to more-flexibly manage free space that is available within the storage devices 158. In particular, embodiments of the invention enable the sizes of the logical volumes 212 to shrink or grow by issuing updates to the address trees 214 and corresponding I/O operations to the storage devices 158.

Figure 3A:
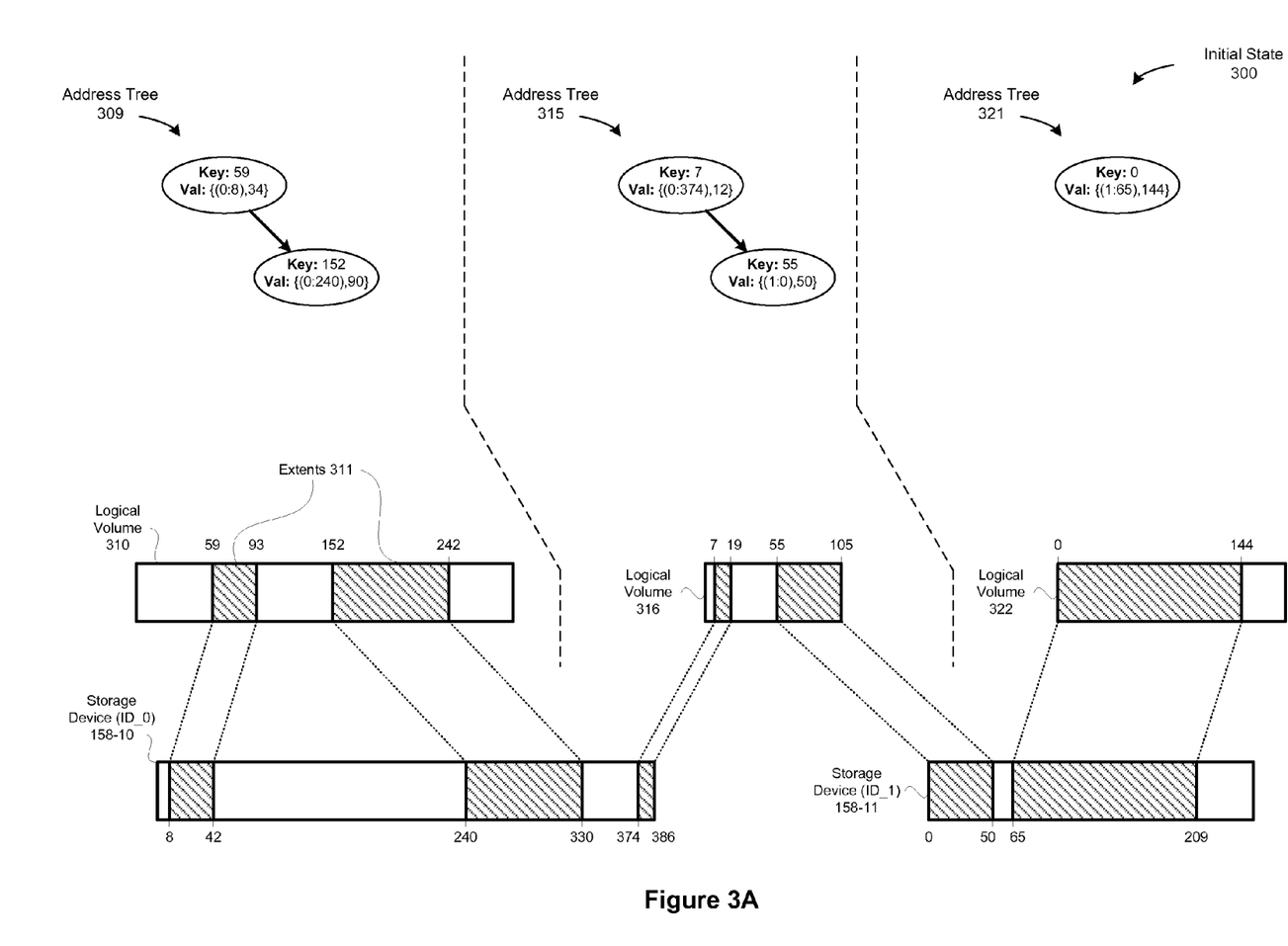
FIGS. 3A-3G illustrate conceptual diagrams of I/O operations made within an example storage environment that is implemented according embodiments of the present invention.
Figure 3B:
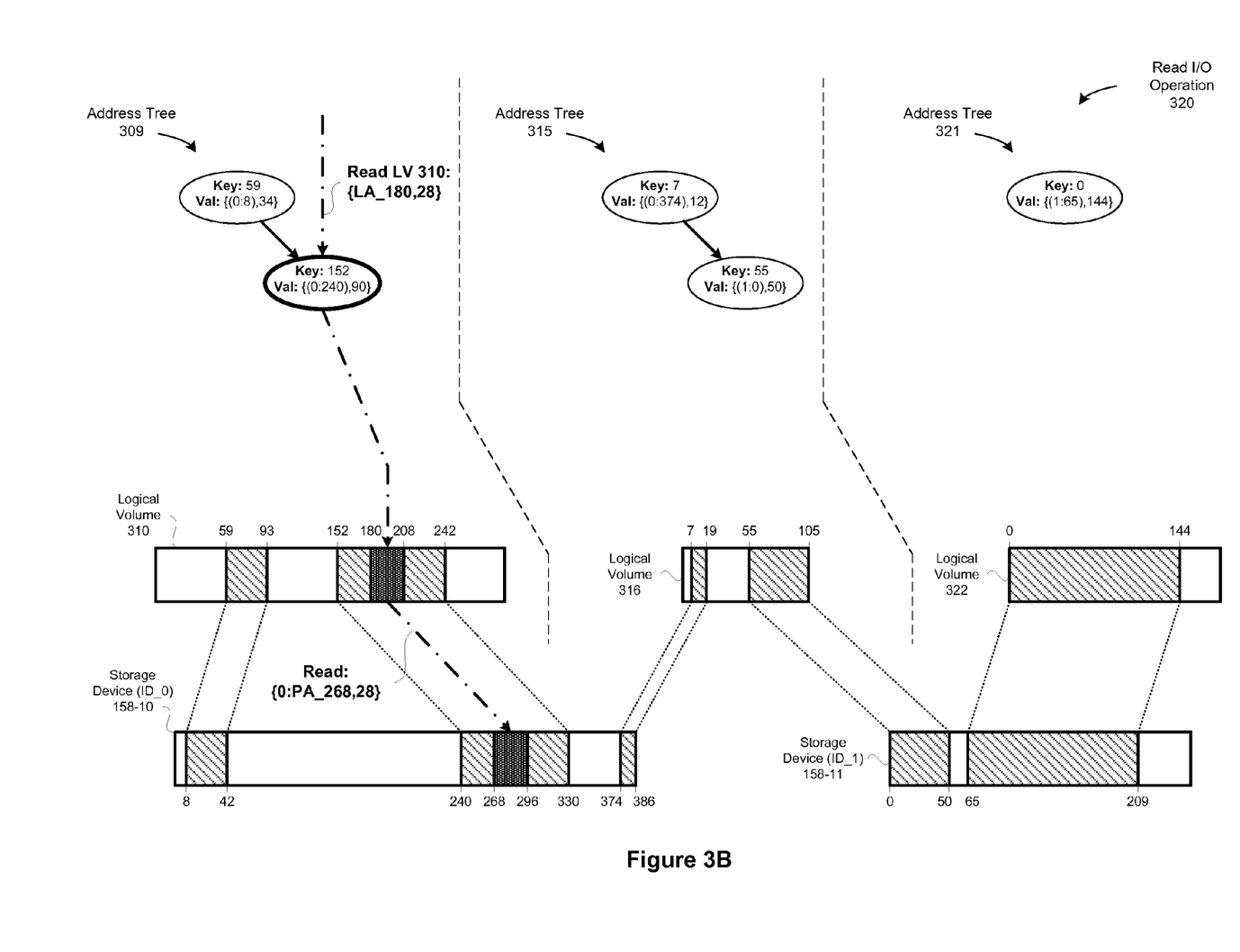
Figure 3C:
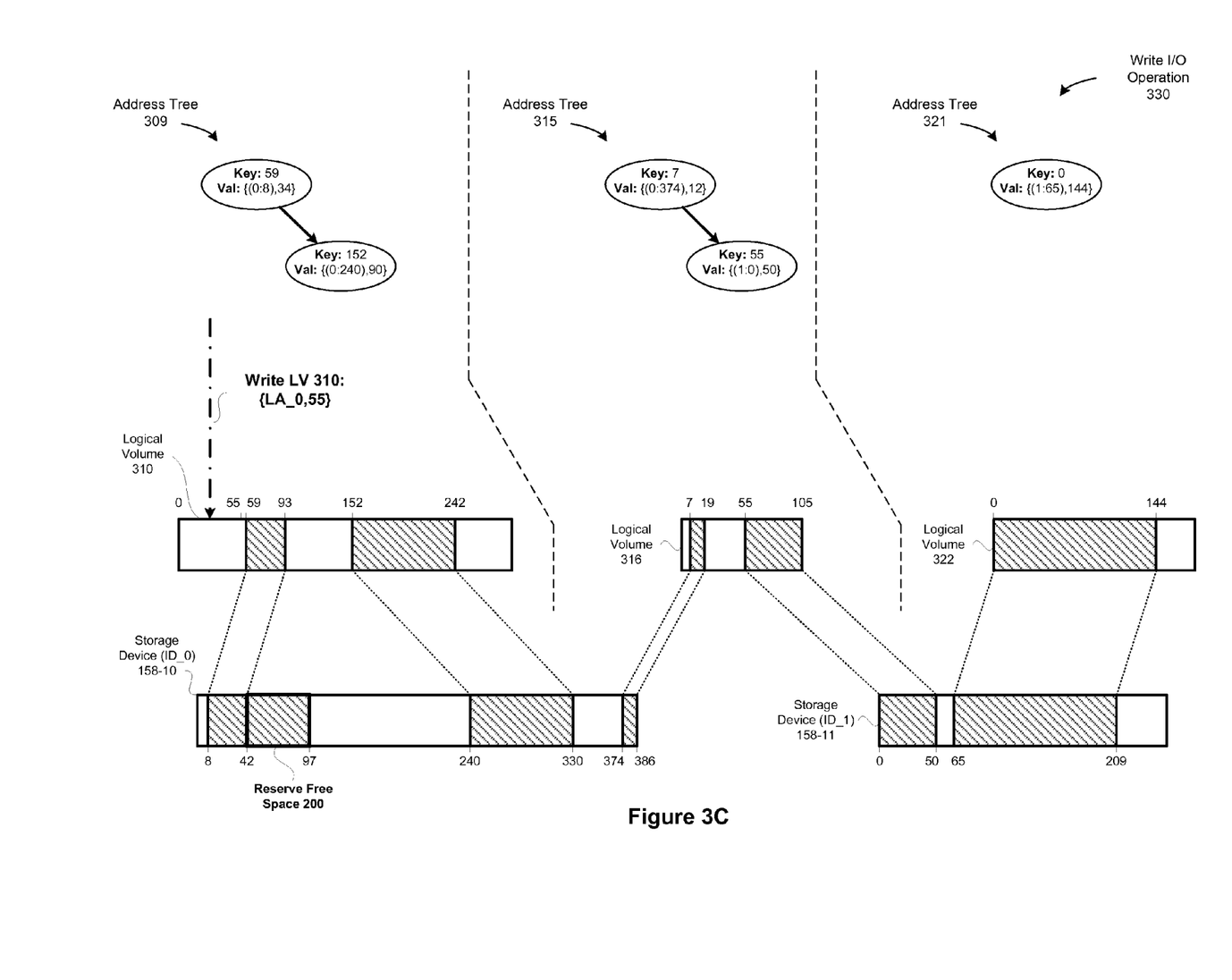
Figure 3D:
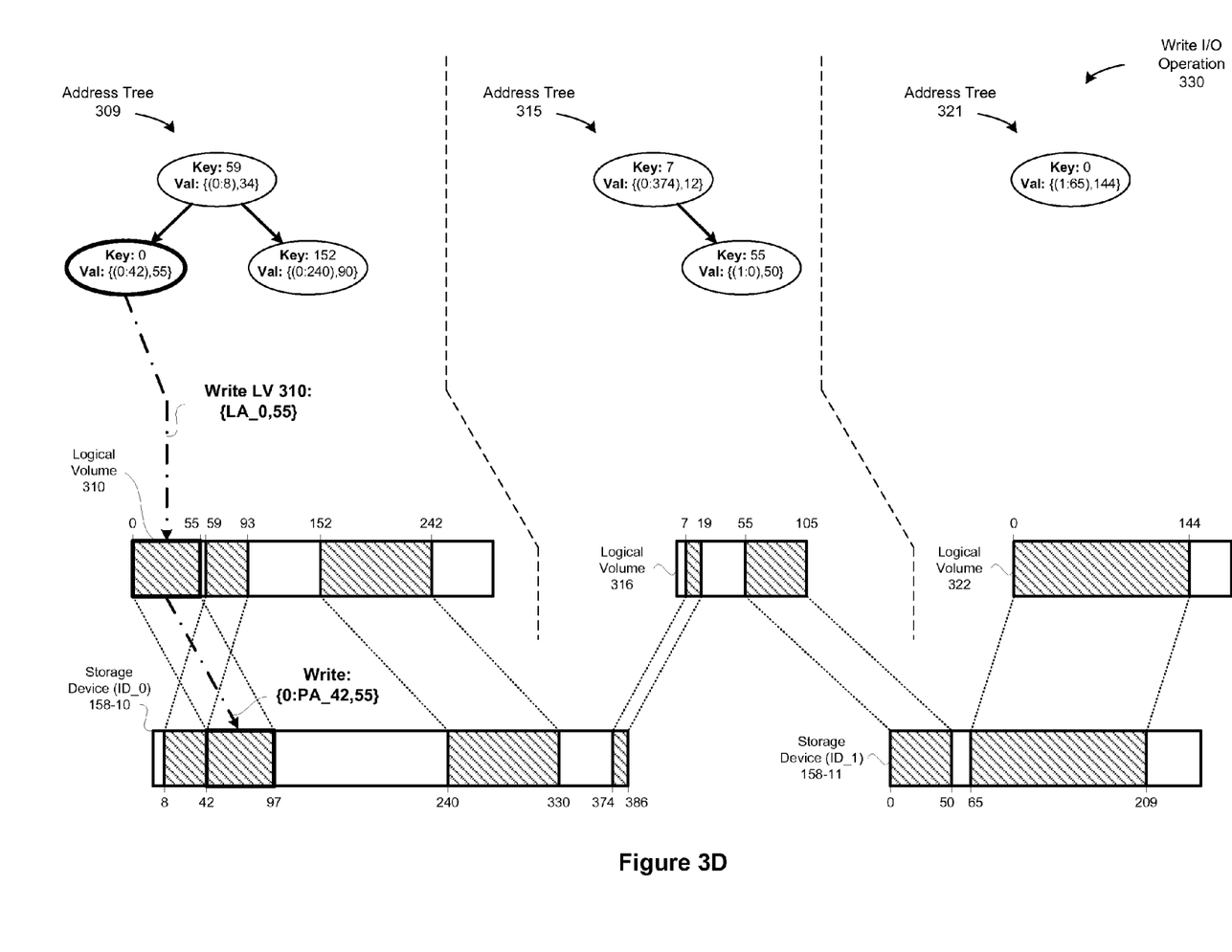
Figure 3E:
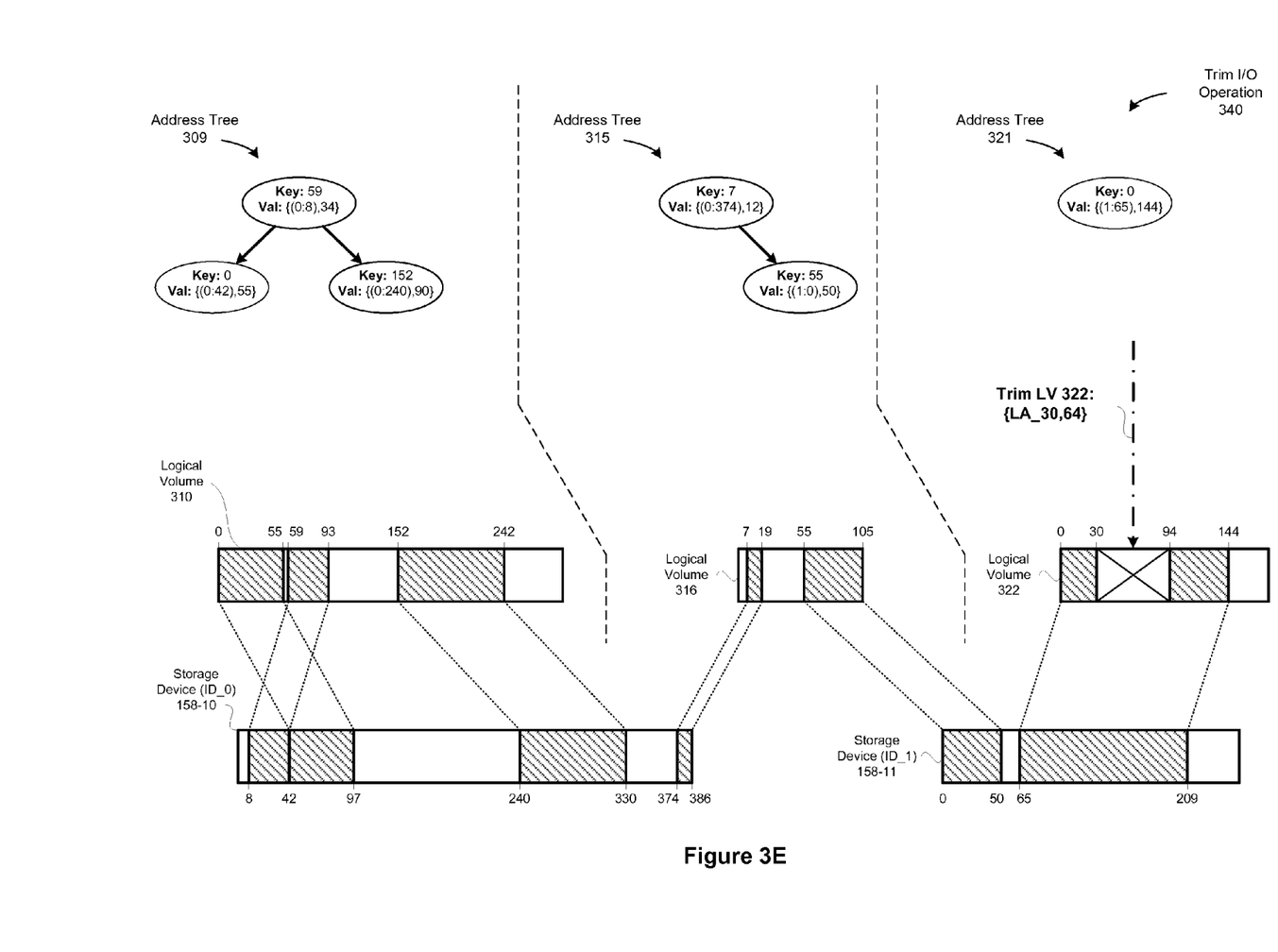
Figure 3F:
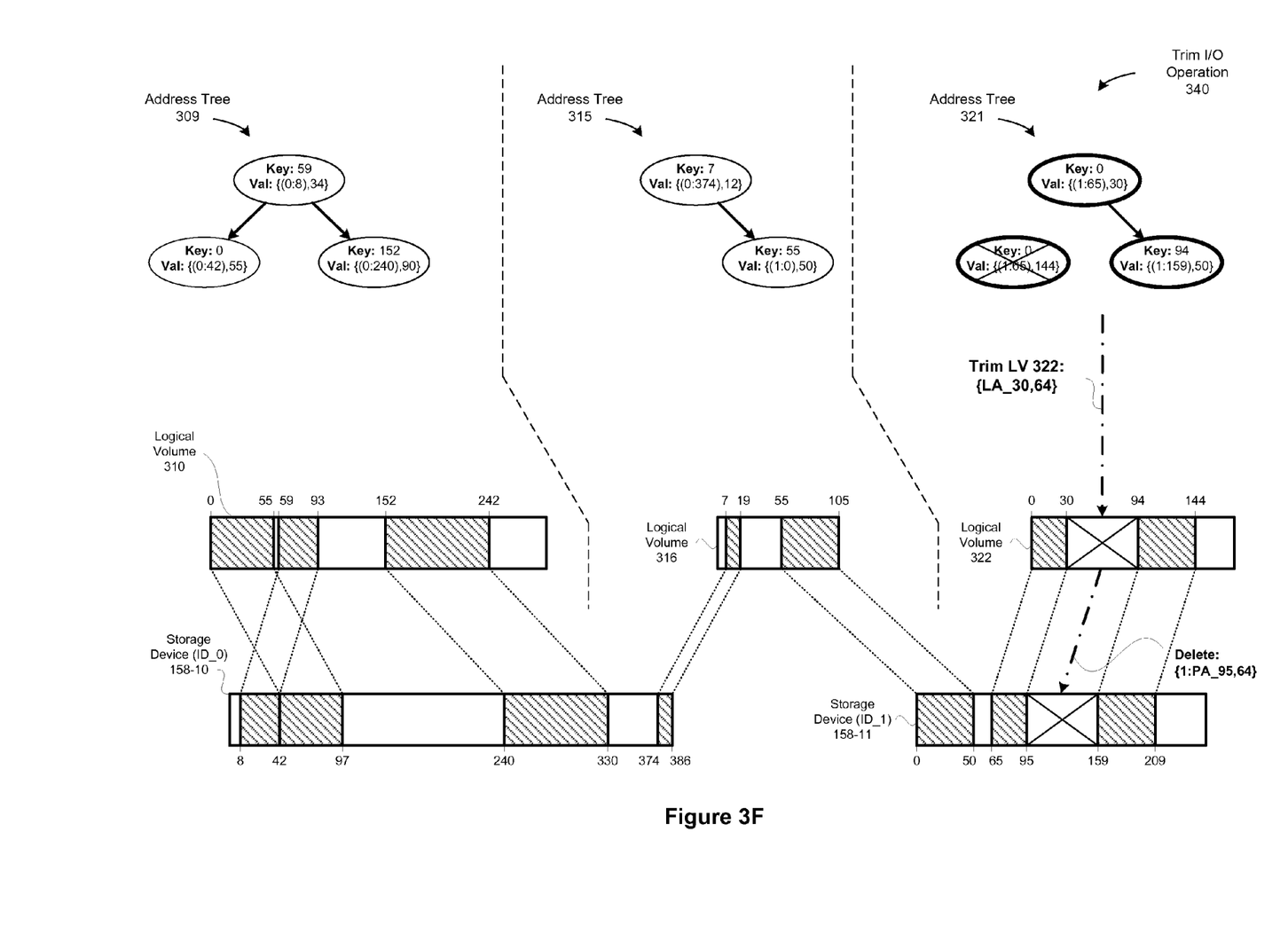
Figure 3G:
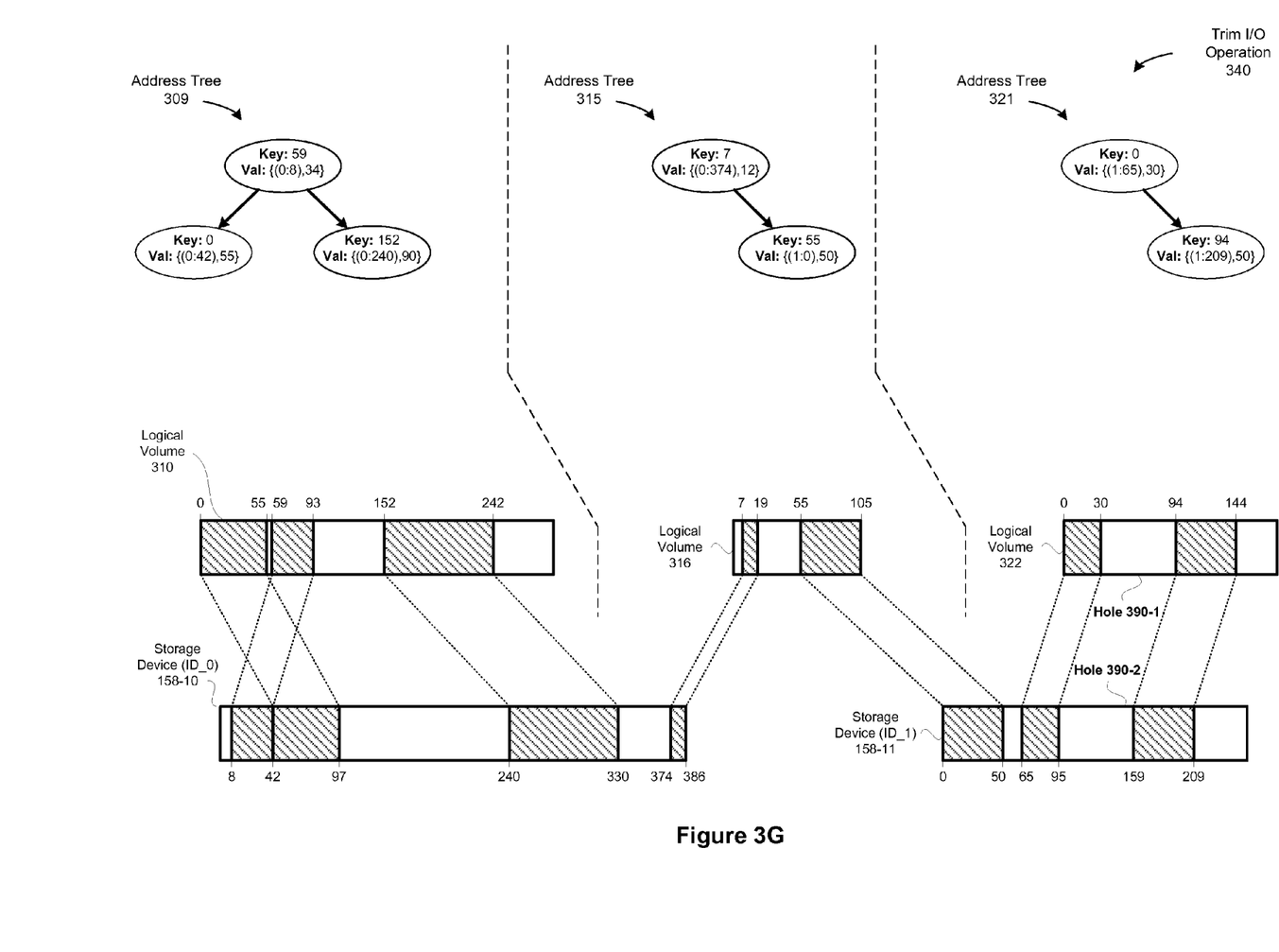

FIGS. 3A-3G illustrate conceptual diagrams of I/O operations made within an example storage environment that is implemented according to embodiments of the present invention. In particular, FIG. 3A illustrates an initial state 300 that defines initial consumption of blocks within three different logical volumes 212 as well as corresponding consumption of blocks within two storage devices 158 that back the three logical volumes 212. Starting with the initial state 300, FIG. 3B illustrates how a read I/O request is carried out against the example storage environment, FIGS. 3C-3D illustrate how a write I/O request is carried out against the example storage environment, and, finally, FIGS. 3E-3G illustrate how a trim I/O request is carried out against the example storage environment. Notably, in FIGS. 3A-3G, each of the three address trees 214 is illustrated as a binary search tree; however, as noted above, the invention is not so limited, and various other data structures can be used to store and order the entries that define the logical volumes 212.

As illustrated, FIG. 3A includes an address tree 309 that corresponds to a logical volume 310 and includes two <key, value> pair entries 216 that adhere to the "<logical_address, (storage_device_ID:offset_blocks, num_blocks)>" format described above in conjunction with FIG. 2: <59, (0:8,34)> and <152, (0:240,90)>. As shown in FIG. 3A, each of the <key,value> pair entries 216 that belong to the address tree 309 define a different "extent" (see extents 311 in FIG. 3A) that is located within the logical volume 310 (according to the logical address parameter) and has a fixed size (according to the num_blocks parameter). For example, key "59" within the address tree 309 is sized at "34" blocks, and key "152" within the address tree 309 is sized at "90" blocks. FIG. 3A also illustrates that each extent in the logical volume 310 is backed by a span of blocks within a storage device 158-10 that is associated with a storage_device_ID of "0", is offset within the storage device 158-10 according to the offset_blocks parameter, and is sized within the storage device 158-10 according to the num_blocks parameter.

FIG. 3A also includes an address tree 315 that corresponds to a logical volume 316 and includes two <key,value> pair entries 216: <7, (0:374,12)> and <55, (1:0,50)>. As shown in FIG. 3A, each of the <key,value> pair entries 216 that belong to the address tree 315 define a different extent that is located within the logical volume 316 and has a fixed size ("12" blocks for key "7," and "50" blocks for key "55"). Notably, FIG. 3A also illustrates that the extent defined by key "7" is backed by one span of blocks within the storage device 158-10, is offset within the storage device 158-10 according to the offset_blocks parameter associated with key "7," and is sized within the storage device 158-10 according to the num_blocks parameter associated with key "7." Similarly, the extent defined by key "55" is backed by one span of blocks within a storage device 158-11 (associated with a storage_device_ID of "1"), is offset within the storage device 158-11 according to the offset_blocks parameter associated with key "55," and is sized within the storage device 158-11 according to the num_blocks parameter associated with key "55."

Finally, FIG. 3A also includes an address tree 321 that corresponds to a logical volume 322 and includes a single <key,value> pair entry 216: <0, (1:65,144)>. As shown in FIG. 3A, the single <key,value> pair entry 216 that belongs to the address tree 321 defines an extent that is located within the logical volume 322 and has a fixed size of "144" blocks. This extent is backed by a span of blocks within the storage device 158-11, is offset by "65" blocks according to the offset_blocks parameter, and is sized as "144" blocks according to the num_blocks parameter.

As noted above, FIG. 3A sets forth the initial state 300 for illustrating various examples that exercise embodiments of the present invention. Beginning with FIG. 3B, an illustration of an example read I/O operation 320 is provided. As illustrated in FIG. 3B, the example read I/O operation 320 is directed to the logical volume 310 and specifies a logical address of "180" with a block size of "28." In response, the FS manager 210 references address tree 309—which corresponds to the logical volume 310—and identifies that the read I/O operation 320 is applied against the key "152." More specifically, the FS manager 210 searches the address tree 309 for the largest key value that is less than or equal to the logical address specified in the read I/O operation 320, which, as noted above, is the key "152." The FS manager 210 then updates the read I/O operation 320 to target the appropriate storage device 158 and offset therein. According to the example illustrated in FIG. 3B, the read I/O operation 320 is translated to target the storage device 158-10 at an offset of "268" blocks with the block size of "28." The read I/O operation 320 is then forwarded to the physical device manager 220 for execution, whereupon the physical device manager 220 returns to the FS manager 210 the data targeted by the read I/O operation 320.

Although not illustrated in FIGS. 3A-3G, each key is capable of being associated with multiple values such that multiple spans of blocks included in one or more storage devices 158 can be used to back a single logical volume 212 extent. For example, consider a <key,value> pair 216 where the key portion is "7" and the value portion is an array of entries where each entry defines values in the format "storage_device_ID:offset_blocks, num_blocks". According to such a configuration, the FS manager 210 automatically detects when multiple values are associated with a key and updates and forwards an appropriate number of translated I/O requests to the file system manager 210 for execution so that all of the data that corresponds to the key "152" is read out of the storage device 158-10.

FIGS. 3C-3D illustrate an example write operation 330 that is carried out against the initial state 300. As illustrated in FIG. 3C, the write operation 330 is directed to the logical volume 310 and specifies a logical address of "0" with a block size of "55." In response, the FS manager 210 references the address tree 309 and identifies that the write operation 330 is applied against a "hole" within the logical volume 310, i.e., an area within the logical volume 310 that is free to store data. In response, the FS manager 210 issues a request to the physical device manager 220 to reserve "55" free blocks that are available within one or more of storage devices 158-10 and 158-11. As illustrated in FIG. 3C, the physical device manager 220 selects blocks "42-97" (i.e., "55" blocks) within the storage device 158-10, which is illustrated as reserved free space 200. Information about the selected blocks is returned to the FS manager 210 so that the FS manager 210 can issue appropriate updates to the address tree 309.

Accordingly, and as illustrated in FIG. 3D, the FS manager 210 updates the address tree 309 to include a new entry with a key "0" that corresponds to the logical address of "0" specified in the write operation 330. The new entry also includes the physical address information returned by the physical device manager 220 (i.e., (0:42)) as well as the block size specified in the write operation 330. The FS manager 210 then notifies the physical device manager 220 that the reserved free space 200 is successfully added to the address tree 309, whereupon the physical device manager 220 carries out the write operation 330 and writes data into the storage device 158-10 starting at offset "42" and spanning "55" blocks. Notably, and according to embodiments of the present invention, each of logical volumes 212 can be configured to advertise an amount of free space that is equivalent to a total amount of free storage space that is currently available on the storage devices 158. In such a configuration, data can be stored into any logical volume 212 up until the free space available within storage devices 158 is completely consumed, thereby enabling the logical volumes to expand in overall size without requiring a complex resizing operation as with conventional approaches.

In addition, the FS manager 210 is configured to handle "trim" requests that are directed to removing a portion of an extent as well as a corresponding portion of blocks included in one or more storage devices 158 that back the portion of the extent targeted for removal. FIGS. 3E-3G illustrate an example trim operation 340 that is carried out against the example storage environment of FIGS. 3A-3G after the write operation 330 is carried out. As shown in FIG. 3E, the trim operation 340 is directed to the logical volume 322 and specifies a logical address of "30" with a block size of 64. In response, the FS manager 210 references the address tree 321 and identifies that the trim operation 340 is applied against the key "0". In response, and as illustrated in FIG. 3F, the FS manager 210 generates a delete I/O operation that includes physical address information that correlates to the parameters of the value associated with the key "0". In particular, the delete I/O operation specifies to delete "64" blocks starting at an offset of "95" blocks within the storage device 158-11. The FS manager 210 then forwards the delete I/O operation to the physical device manager 220 for execution.

The physical device manager 220 carries out the delete I/O operation and notifies the FS manager 210 if and when the delete I/O operation completed successfully. In response, and as illustrated in FIG. 3F, the FS manager 210 updates the address tree 321 to reflect the new organization of the blocks in the storage device 158-11 that back the extent targeted by the trim operation 340. In particular, the original extent defined by the <key,value> pair 216 for the key "0" is replaced by two new extents, and are defined by two new <key,value> pairs 216: <0,(1:65,30)> and <94,(1:159,50)>. Thus, as shown in FIG. 3G, the two new <key,value> pairs 216 accurately define the resulting two extents. Also illustrated are holes 390-1 and 390-2 that result from the trim operation 340 and represent space that has been freed to store additional data.

Accordingly, the embodiments described herein enable both the FS manager 210 and the physical device manager 220 to effectively utilize storage space within the storage devices 158. In particular, embodiments of the invention enable the sizes of the logical volumes 212 to shrink or grow by issuing updates to the address trees 214 and corresponding I/O operations to the storage devices 158. A more detailed walkthrough of issuing such updates and corresponding I/O operations is provided below in conjunction with FIGS. 4A-4B.

Figure 4A:
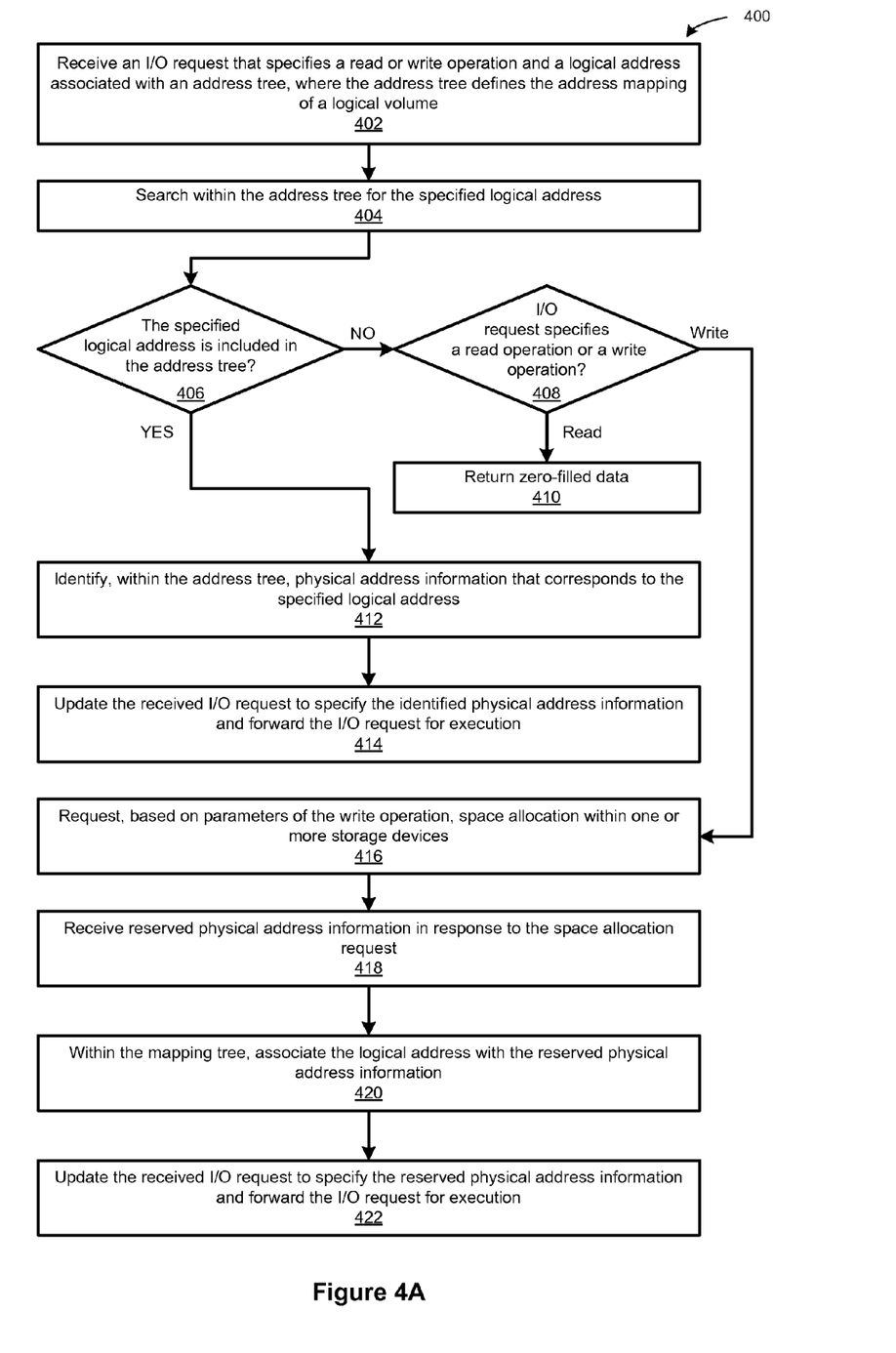
FIGS. 4A-4B illustrate methods for carrying out I/O requests that specify read, write or trim I/O operations, according to one embodiment of the invention.

FIG. 4A illustrates a method 400 for carrying out an I/O request that specifies a read/write operation, according to one embodiment of the invention. Although the method steps 400 are described in conjunction with the systems of FIGS. 1-2, persons skilled in the art will understand that any system configured to perform the method steps, in any order, is within the scope of the invention.

As shown, the method 400 begins at step 402, where the FS manager 210 receives an I/O request that specifies a read or write operation and a logical address associated with an address tree 214, where the address tree 214 defines the address mapping of a logical volume 212.

At step 404, the FS manager 210 searches within the address tree 214 for the specified logical address. At step 406, the FS manager 210 determines whether the specified logical address is included in the address tree 214. If, at step 406, the FS manager 210 determines that the specified logical address is included in the address tree 214, then the method 400 proceeds to step 412.

At step 412, the FS manager 210 identifies, within the address tree 214, physical address information that corresponds to the specified logical address. At step 414, the FS manager 210 updates the received I/O request to specify the identified physical address information and forwards the I/O request to the physical device manager 220 for execution, whereupon the method 400 ends.

Referring back now to step 406, if the FS manager 210 determines that the specified logical address is not included in the address tree 214, then the method 400 proceeds to step 408, where the FS manager 210 determines whether the I/O request specifies a read operation or a write operation. Step 408 is executed since the FS manager 210 should issue zero-filled data when the received I/O request is directed to reading data that does not exist; conversely, the FS manager 210 should create an entry in the address tree 214 when the received I/O request is directed to writing data into a logical address that is unallocated.

Accordingly, if, at step 408, the FS manager 210 determines that the I/O request specifies a read operation, then the method 400 proceeds to step 410, where the FS manager 210 returns zero-filled data. Otherwise, the method 400 proceeds to step 416, where the FS manager 210 requests, based on parameters of the write operation, space allocation within one or more storage devices 158. As previously described above in conjunction with FIGS. 3A-3G, the physical device manager 220 is configured to receive such a request and to analyze the storage devices 158 to determine one or more effective areas to reserve for the data. The physical device manager 220 then returns reserved physical address information to the FS manager 210 for processing.

Accordingly, at step 418, the FS manager 210 receives reserved physical address information from the physical device manager 220 in response to the space allocation request. At step 420, the FS manager 210, within the mapping tree, associates the logical address with the reserved physical address information. Finally, at step 422, the FS manager 210 updates the received I/O request to specify the reserved physical address information and forwards the I/O request to the physical device manager 220 for execution.

Figure 4B:
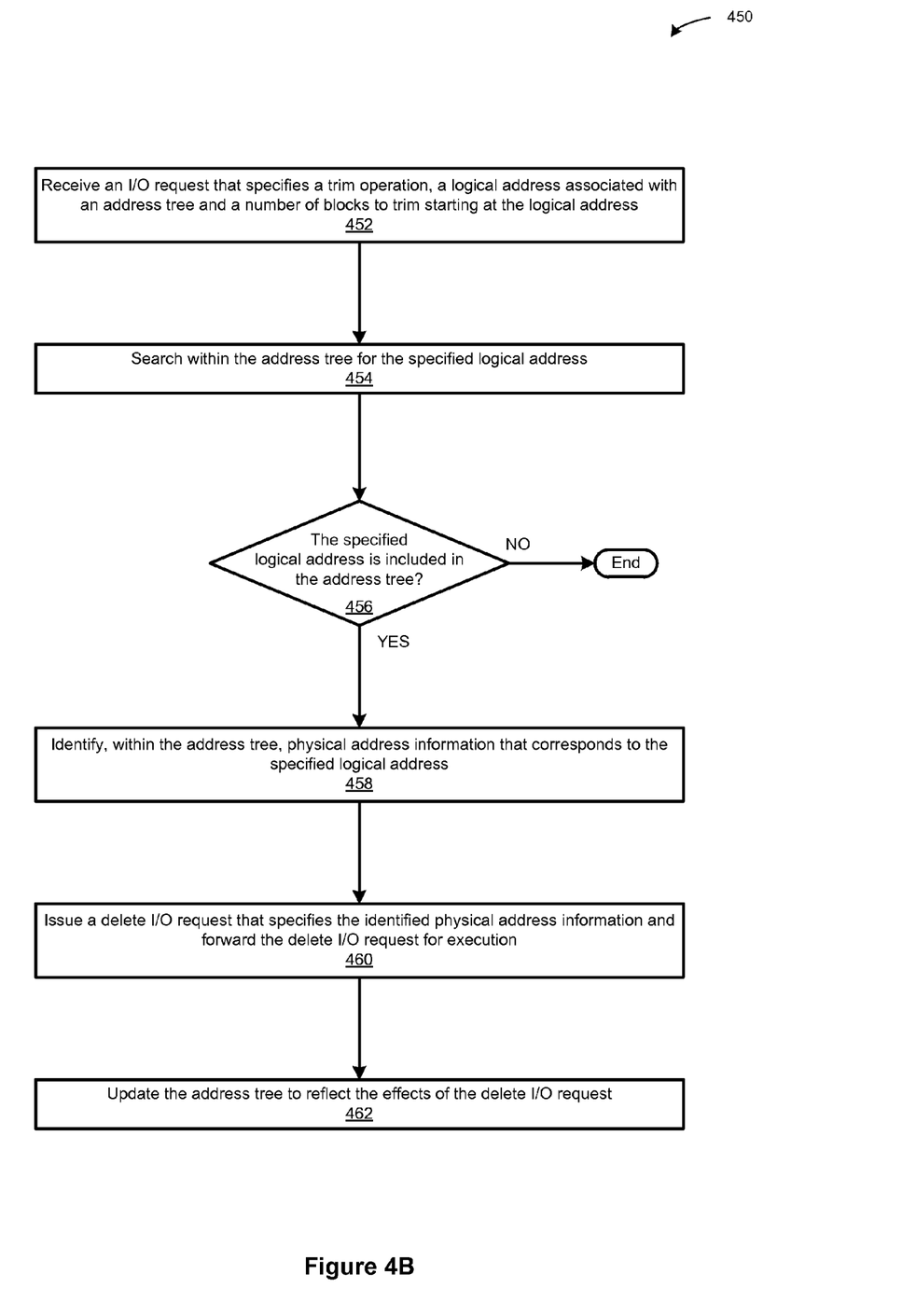

FIG. 4B illustrates a method 450 for carrying out an I/O request that specifies a trim operation, according to one embodiment of the invention. Although the method steps 450 are described in conjunction with the systems of FIGS. 1-2, persons skilled in the art will understand that any system configured to perform the method steps, in any order, is within the scope of the invention As shown, the method 450 begins at step 452, where the FS manager 210 receives an I/O request that specifies a trim operation, a logical address associated with an address tree 214 and a number of blocks to trim starting at the logical address. Again, the address tree 214 specified in the I/O request is associated with a particular logical volume 212 that is backed by one or more of the storage devices 158.

At step 454, the FS manager 210 searches within the address tree 214 for the specified logical address. At step 456, the FS manager 210 determines whether the specified logical address is included in the address tree 214. If, at step 456, the FS manager 210 determines that the specified logical address is not included in the address tree 214, then the method 450 ends. Otherwise, the method 450 proceeds to step 458, where the FS manager 210 identifies, within the address tree 214, physical address information that corresponds to the specified logical address. At step 460, the FS manager 210 issues a delete I/O request that specifies the identified physical address information and forwards the delete I/O request to the physical device manager 220 for execution. At step 462, the FS manager 210 updates the address tree 214 to reflect the effects of the delete I/O request.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A computer-implemented method for carrying out an input/output (I/O) operation issued to a logical volume, the method comprising:

receiving the I/O operation, wherein the I/O operation specifies a logical address that corresponds to an address tree associated with the logical volume;

parsing the address tree to identify an entry therein, if any, that is associated with the logical address, wherein:
  the entry includes a key/value pair,
  the key corresponds to the logical address, and
  the value comprises:
    (1) physical address information comprising (i) an identifier for a storage device, and (ii) an address offset that is specific to the storage device, and
    (2) a number of blocks that succeed the logical address; and when the entry is identified, and the I/O operation specifies a trim request:
  generating one or more translated I/O operations based on the entry, wherein generating the one or more translated I/O operations comprises:
    generating one or more delete operations based on one or more parameters of the trim request as well as the physical address information, and
    forwarding the one or more translated I/O operations to a physical device manager to carry out the one or more translated I/O operations, wherein forwarding the one or more translated I/O operations comprises:
forwarding the one or more delete operations to the physical device manager to carry out the one or more delete operations.

2. The computer-implemented method of claim 1, further comprising:
when the entry is not identified, and the I/O operation specifies a read request:
returning zero-filled data.

3. The computer-implemented method of claim 1, further comprising:
when the entry is not identified, and the I/O operation specifies a write request:
issuing an allocation request to the physical device manager to allocate a number of blocks specified in the I/O operation;
receiving, from the physical device manager, generated physical address information that specifies reserved storage space sized according to the number of blocks specified in the I/O operation;
generating one or more entries within the address tree that is associated with the logical address to yield one or more generated entries;
storing the generated physical address information in the one or more generated entries;
translating the I/O operation into one or more write operations based on the generated physical address information; and
forwarding the one or more write operations to the physical device manager to carry out the one or more write operations.

4. The computer-implemented method of claim 1, further comprising:
determining that the trim request invalidates the entry in the address tree; and
replacing the entry with generated one or more new entries that reflect effects of the trim request.

5. The computer-implemented method of claim 1, wherein the logical address and the number of blocks that exceed the logical address define an extent within the logical volume.

6. The computer-implemented method of claim 1, wherein the address tree is implemented using a B-Tree or a log-structured merge (LSM) tree.

7. A non-transitory computer-readable storage medium storing instructions that, when executed by a processor included in a computing device, cause the computing device to carry out an input/output (I/O) operation issued to a logical volume, by performing steps that include:
receiving the I/O operation, wherein the I/O operation specifies a logical address that corresponds to an address tree associated with the logical volume;
parsing the address tree to identify an entry therein, if any, that is associated with the logical address, wherein:
the entry includes a key/value pair,
the key corresponds to the logical address, and
the value comprises:
(1) physical address information comprising (i) an identifier for a storage device, and (ii) an address offset that is specific to the storage device, and
(2) a number of blocks that succeed the logical address; and
when the entry is identified, and the I/O operation specifies a trim request:
generating one or more translated I/O operations based on the entry, wherein generating the one or more translated I/O operations comprises:
generating one or more delete operations based on one or more parameters of the trim request as well as the physical address information, and
forwarding the one or more translated I/O operations to a physical device manager to carry out the one or more translated I/O operations, wherein forwarding the one or more translated I/O operations comprises:
forwarding the one or more delete operations to the physical device manager to carry out the one or more delete operations.

8. The non-transitory computer-readable storage medium of claim 7, wherein the steps further include:
when the entry is not identified, and the I/O operation specifies a read request:
returning zero-filled data.

9. The non-transitory computer-readable storage medium of claim 7, wherein the steps further include:
when the entry is not identified, and the I/O operation specifies a write request:
issuing an allocation request to the physical device manager to allocate a number of blocks specified in the I/O operation;
receiving, from the physical device manager, generated physical address information that specifies reserved storage space sized according to the number of blocks specified in the I/O operation;
generating one or more entries within the address tree that is associated with the logical address to yield one or more generated entries;
storing the generated physical address information in the one or more generated entries;
translating the I/O operation into one or more write operations based on the generated physical address information; and
forwarding the one or more write operations to the physical device manager to carry out the one or more write operations.

10. The non-transitory computer-readable storage medium of claim 7, wherein the steps further include:
determining that the trim request invalidates the entry in the address tree; and
replacing the entry with generated one or more new entries that reflect effects of the trim request.

11. The non-transitory computer-readable storage medium of claim 7, wherein the logical address and the number of blocks that exceed the logical address define an extent within the logical volume.

12. The non-transitory computer-readable storage medium of claim 7, wherein the address tree is implemented using a B-Tree or a log-structured merge (LSM) tree.

13. A system, comprising:
one or more storage devices; and
a processor configured to cause the system to carry out an input/output (I/O) operation issued to a logical volume, by performing steps that include:
receiving the I/O operation, wherein the I/O operation specifies a logical address that corresponds to an address tree associated with the logical volume;
parsing the address tree to identify an entry therein, if any, that is associated with the logical address, wherein:
the entry includes a key/value pair,
the key corresponds to the logical address, and
the value comprises:
(1) physical address information comprising (i) an identifier for a particular storage device of the one or more storage devices, and (ii) an address offset that is specific to the particular storage device of the one or more storage devices, and (2) a number of blocks that succeed the logical address; and when the entry is identified, and the I/O operation specifies a trim request:

generating one or more translated I/O operation based on the entry, wherein generating the one or more translated I/O operations comprises:

generating one or more delete operations based on one or more parameters of the trim request as well as the physical address information, and forwarding the one or more translated I/O operations to a physical device manager to carry out the one or more translated I/O operations, wherein forwarding the one or more translated I/O operations comprises:

forwarding the one or more delete operations to the physical device manager to carry out the one or more delete operations.

14. The system of claim 13, wherein the steps further include:

when the entry is not identified, and the I/O operation specifies a read request:

returning zero-filled data.

15. The system of claim 13, wherein the steps further include:

when the entry is not identified, and the I/O operation specifies a write request:

issuing an allocation request to the physical device manager to allocate a number of blocks specified in the I/O operation;

receiving, from the physical device manager, generated physical address information that specifies reserved storage space sized according to the number of blocks specified in the I/O operation;

generating one or more entries within the address tree that is associated with the logical address to yield one or more generated entries;

storing the generated physical address information in the one or more generated entries;

translating the I/O operation into one or more write operations based on the generated physical address information; and forwarding the one or more write operations to the physical device manager to carry out the one or more write operations.

16. The system of claim 13, wherein the steps further include:

determining that the trim request invalidates the entry in the address tree; and replacing the entry with generated one or more new entries that reflect effects of the trim request.

17. The system of claim 13, wherein the logical address and the number of blocks that exceed the logical address define an extent within the logical volume.

\* \* \* \* \*